(12) United States Patent
Cugini et al.

(10) Patent No.: US 11,079,660 B2
(45) Date of Patent: Aug. 3, 2021

(54) OPTICAL FILTER HOLDER

(71) Applicant: NOAH Systems, LLC, Vista, CA (US)

(72) Inventors: Mario A Cugini, Vista, CA (US); Joshua Aaron Swett, Oceanside, CA (US); Thomas J Horner, Vista, CA (US)

( * ) Notice: Subject to any disclaimer, the term of this patent is extended or adjusted under 35 U.S.C. 154(b) by 108 days.

(21) Appl. No.: 16/377,152

(22) Filed: Apr. 5, 2019

(65) Prior Publication Data
US 2020/0319533 A1    Oct. 8, 2020

(51) Int. Cl.
*G03B 17/14*       (2021.01)
*G02B 7/00*        (2021.01)

(52) U.S. Cl.
CPC .............. *G03B 17/14* (2013.01); *G02B 7/006* (2013.01)

(58) Field of Classification Search
CPC ................................ G03B 17/14; G02B 7/006
USPC .......................................... 359/723, 811, 820
See application file for complete search history.

(56) References Cited

U.S. PATENT DOCUMENTS

| | | | |
|---|---|---|---|
| 4,247,190 A * | 1/1981 | Hashimoto | G03B 17/14 |
| | | | 359/828 |
| 4,384,767 A | 5/1983 | Kawai | |
| 5,040,011 A | 8/1991 | Tiffen | |
| 5,208,624 A * | 5/1993 | MacKay | G03B 11/00 |
| | | | 396/530 |
| 5,528,328 A | 6/1996 | O'Farrill | |
| D380,296 S | 7/1997 | Smith | |
| 6,102,556 A | 8/2000 | Lieberman et al. | |
| D589,545 S | 3/2009 | Murphy et al. | |
| 8,385,004 B2 | 2/2013 | Hicks | |
| D759,140 S | 6/2016 | Baker et al. | |
| 9,883,016 B2 | 1/2018 | Eromaki | |

\* cited by examiner

*Primary Examiner* — James R Greece
(74) *Attorney, Agent, or Firm* — Palomar Patent; MaryJo Redman; Calif Tervo

(57) ABSTRACT

Self-adjusting filter holder assembly (10) consists of lens adapter (20) and filter holder (60). Lens adapter (20) has a variably-sized central opening (45) that accommodates lenses with a range of diameters. Filter holder (60) holds a single planar filter and is mounted onto lens adapter (20) with a detachable, rotatable fitting.

7 Claims, 4 Drawing Sheets

OPTICAL FILTER HOLDER

FIELD OF THE INVENTION

This invention relates generally to camera lens accessories, and more particularly to a rotatable filter holder assembly that adjusts to fit a range of lens diameters.

BACKGROUND OF THE INVENTION

Cameras are often fitted with optical filters to modify the incoming light before it is received by photographic film or an image sensor. Commonly, filters are made of glass and are attached to a circular metal frame that protects the glass and mounts securely onto a camera lens to hold the filter in place. Many lenses have mounting threads that threaded filter frames can be screwed onto. Bayonet mounting is a less common way to attach filters and there are other specialized means.

Both threaded and bayonet mounting systems require moderately precise machining and can be expensive, especially if many types of filter are required. Precise hand control is also needed for attaching filters and can be awkward if the camera is not on a tripod. For some photographic situations, filters must be changed frequently and rapidly. In cold weather, the chance of cross-threading or dropping a filter onto the ground—or into the ocean—is even greater.

Framed filters have a fixed diameter and can only be directly mounted on a lens of the same size. A photographer must choose whether to buy a set of filters for each lens or to use adapters that match the diameter of the lens on one side and the filter on the other. In some cases, the most cost-effective solution is to use both lens adapters and "step rings" to enable all the filters to fit all the camera lenses.

There are also less expensive filters made of plastic film of various types. They may be "dropped in" the back of a very large lens, taped or clipped in front of the lens, or attached by other, often improvised, means. Various bracket-like holders are available to hold film filters in front of a lens, but they tend to be bulky and do not necessarily hold the filter as flat as it should be. Film filters are often easier to change than framed glass filters, but they are also easier to damage. Handling film filters in a windy location can be challenging.

Film filters are provided as squares or large rectangles that can be cut to size. The available holders for filter films recognize this and generally have a flat bottom support and straight sides to help prop the filter up so it doesn't flop over onto itself.

Some sorts of filter, notably gradient and polarizing, as well as some effects filters, need to be properly oriented to have the desired effect. These filters are typically mounted in a rotatable frame or mounted on a rotatable adapter, which naturally adds to the cost. Filter holders for plastic film filters are usually more difficult to rotate freely and may at best be rotatable in 90-degree increments.

Photographers often change filters, and lenses, and cameras, rapidly in response to changing light conditions or to try to catch the best possible version of a scene. They develop clever ways to manage their equipment and accessories, but in low light or a crowded situation, even the best-organized photographers will wish for a simpler solution.

Forensic investigators are also somewhat dependent upon photographic equipment for collecting and documenting evidence. They often spray various indicator dye solutions in surfaces in a suspected crime location and illuminate the scene with a sequence of different wavelengths of light. Different types of evidence fluoresce at characteristic wavelengths when exposed to appropriate indicator and wavelength of excitation illumination.

The emitted light is typically not very bright and may be hard to see against certain colors of background. A forensic photographer often works in very low ambient light and uses certain color filters known to enhance contrast between the expected colors of fluorescence and the backgrounds of the scene. Various mechanical and electronic means for rapidly changing filters have been proposed, but they tend to be bulky and heavy. Installing a new filter in the array may be difficult or even impossible.

Therefore, there is a need for an inexpensive, lightweight, and easy to use system for mounting filters on cameras, even in windy or poorly lit conditions.

SUMMARY OF THE INVENTION

The invention is a self-adjusting filter holder assembly consisting of a lens adapter and a filter holder. The lens adapter has a variably-sized central opening that accommodates lenses with a range of diameters. The filter holder holds a single optical filter and is mounted onto the lens adapter with a rotatable fitting.

The lens adapter has a frame shaped like an upside-down, square letter U. Left and right side-rails are connected by a top rail. Within the open part of the U are disposed two curved jaws that open and close so as to create a large circular opening in the fully open position or a narrower ellipse-like opening in the compressed, or closed-down, position.

In the most preferred embodiment illustrated, the lower curved jaw is connected immovably to the side-rails. The upper curved jaw has ends that fit into grooves in the inside faces of the left and right side-rails so that the jaw can slide up and down. A coil spring biases the sliding jaw into the compressed position.

To attach the lens adapter to a camera lens, the user moves the sliding jaw with a finger to the fully open position then inserts the end of the lens into the circular opening. Upon release of the sliding jaw, the coil spring pushes the sliding jaw downward against the camera lens. Resilient gripping material inside the jaws keeps the adapter securely on the camera lens until the adapter is removed by the user.

The filter holder is a frame for a plastic film optical filter, which is inserted through a slot. The filter is visible through a circular aperture in the frame. If desired, each filter may be stored in its own filter holder frame for protection and rapid installation on the camera.

The filter holder is mounted on the lens adapter with a rotatable connection means, such as cooperative rings on filter holder and lens adapter that snap together when pressed. The lens adapter has a projecting ring around its central opening. The filter holder has a circular groove in the rear face that receives the adapter ring with a snap fit. The ring and groove are of resilient, low friction material so that the filter holder can be freely rotated 360 degrees while mounted on the lens.

The self-adjusting filter holder assembly allows filters to be rapidly installed and removed from a camera using only one hand.

The filter holder preferably includes a projecting connector ring on the front face, identical to the one on the lens adapter. A second filter holder may thus be stacked onto the lens adapter. Stacked filter holders may be rotated independently.

The filter holder assembly is thus especially useful to a photographer with multiple cameras and filters. Instead of bags full of expensive filters of different diameters and multiple lens adapters, the photographer can carry only one or possibly two lens adapters and one set of film filters mounted in filter holders of the present invention.

Filters may be pressed onto and peeled off from the camera rapidly and tossed into a bag or onto any flat surface without damage. The entire filter holder assembly can be removed from one camera and mounted on another in seconds. The filter holder assembly grips any roughly cylindrical feature, so it is equally easy to mount the device onto a camera's standard lens, an auxiliary lens, a lens hood, or a lens with conventional threaded filter frames already mounted.

Other features and many attendant advantages of the invention will become more apparent upon a reading of the following detailed description together with the drawings wherein like reference numerals refer to like parts throughout.

DETAILED DESCRIPTION OF THE INVENTION

Figure 1:
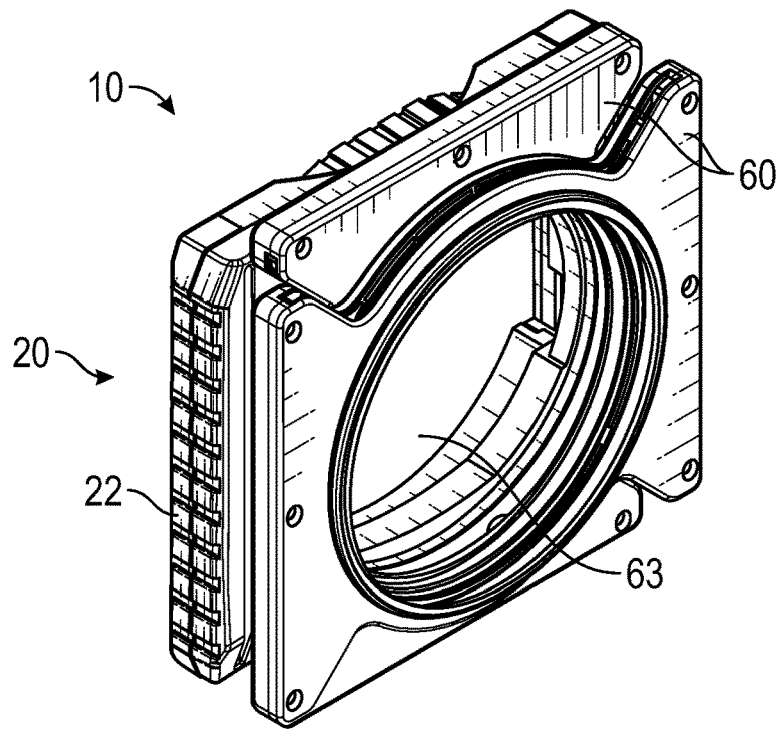
FIG. 1 is a front, top, left side perspective view of an exemplary embodiment of the self-adjusting filter holder assembly of the invention showing two filter holder components.

FIG. 1 is a front, top, left side perspective view of an exemplary embodiment of the self-adjusting filter holder assembly 10 of the present invention. Assembly 10 generally includes a lens adapter 20 for connecting filter holder assembly 10 to a camera lens, and a filter holder 60 for holding filter, such as a plastic film filter, in front of the lens. As shown in the drawing, multiple filter holders 60 may be ganged.

Figure 2:
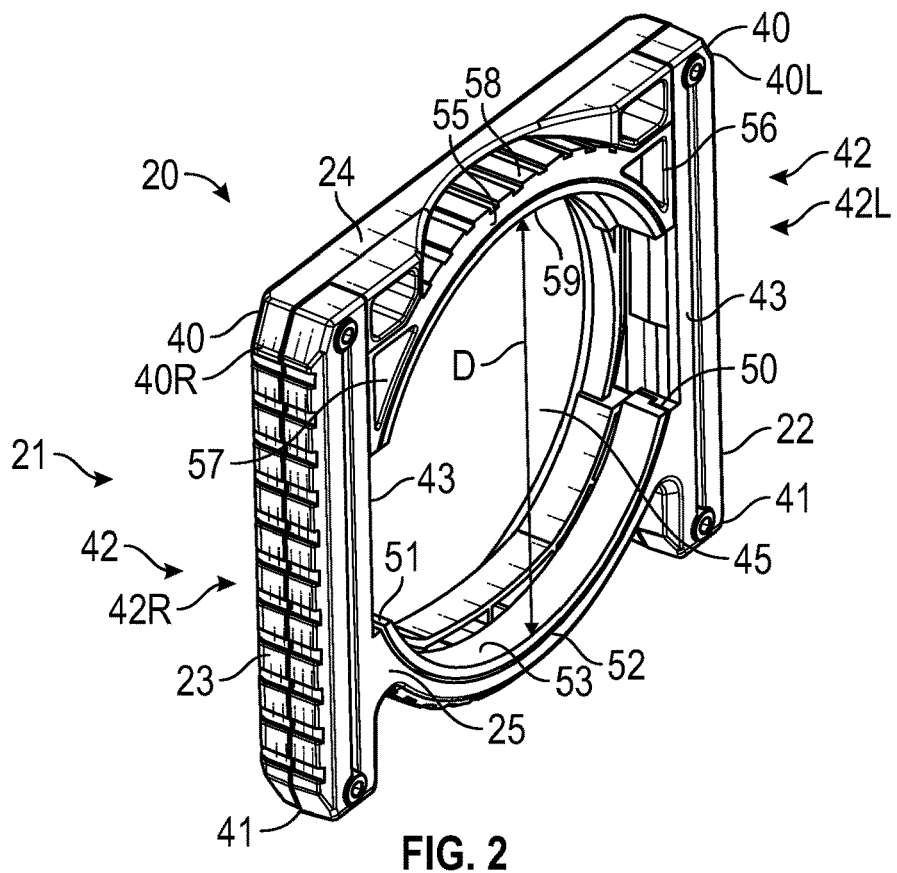
FIG. 2 is a rear, top, right side perspective view of the lens adapter component of the assembly of FIG. 1.

FIG. 2 is a rear, top, right side perspective view of lens adapter 20 of assembly 10 of FIG. 1. Lens adapter 20 includes a frame body 21, including a left side-rail 22, a right side-rail 23, and a top rail 24 that connects the two side-rails 22, 23 to form an upside-down square "U" shape. Each side-rail 22,23 includes a top end 40, a bottom end 41, a middle portion 42 between top end 40 and bottom end 41, and an inner face 43, facing the inner open part of the U. Top rail 24 preferably connects left top end 40L and right top end 40R.

Body 21 further includes a fixed jaw member 25 that connects left middle portion 42L and right middle portion 42R. Fixed jaw member 25 includes a left end 50, a right end 51, and an arcuate jaw 52 therebetween with a concave face 53. Fixed arcuate jaw 52 is generally somewhat less than a half circle.

A movable, or sliding, jaw member 55 is disposed opposite fixed jaw member 25. Movable jaw member 55, best seen in FIG. 3, includes a left end 56, a right end 57, and an arcuate jaw 58 therebetween with a concave face 59. Concave face 59 of sliding arcuate jaw 58 preferably is shaped with the same curvature as fixed arcuate jaw 52.

Arcuate jaws 52,58 oppose each other so that their concave faces 53,59 are directed toward each other. Together, fixed arcuate jaw 52 and moving arcuate jaw 58 outline a jaw central opening 45. In the figures, fixed jaw member 55 is shown as the lower of the two jaw members 25,55 and sliding jaw member 55 is disposed above fixed jaw member 25. Their positions may equally well be reversed, so long as both jaw concave faces 53,59 face each other.

FIG. 2 shows arcuate jaws 52,58 defining a jaw central aperture or opening 45 that is an approximate circle. This position of arcuate jaws 52,58 is called the open, or extended, position. Distance D is the maximum distance between the center points of concave faces 53,59 of arcuate jaws 52,58 and corresponds to the largest diameter of camera lens that jaw central opening 45 can receive. Concave faces 53,59 are preferably made of, or lined with, a resilient high-friction material suitable for gripping the camera lens.

Figure 3:
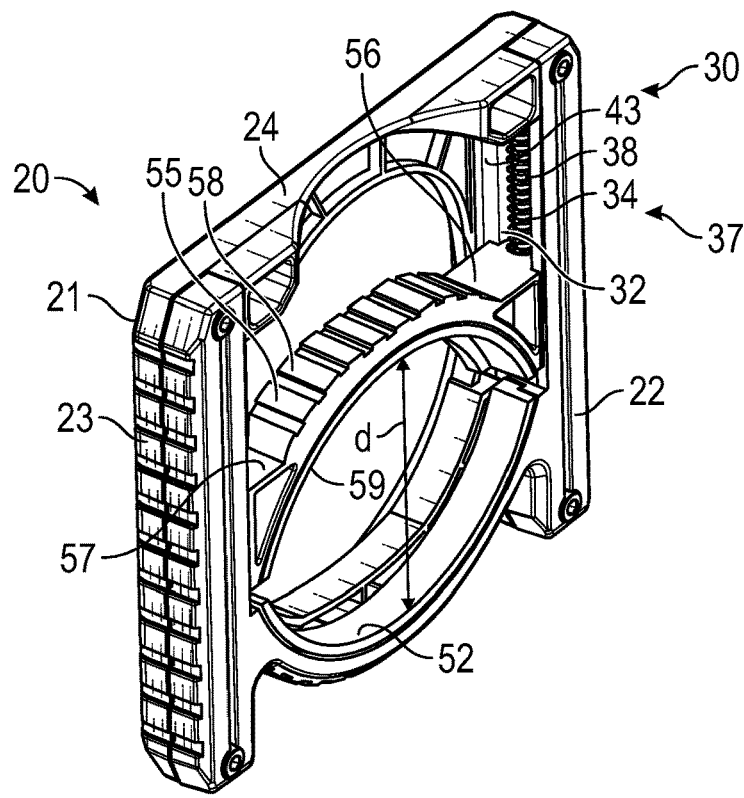
FIG. 3 is a rear, top, right side perspective view of the lens adapter component of the assembly of FIG. 2 in the closed down position.

FIG. 3 is a rear, top, right side perspective view of lens adapter 20 of the assembly 10 of FIG. 2 in the compressed, or closed-down, position. Distance d is the minimum displacement between the center points of arcuate jaws 52,58 and is the smallest diameter of camera lens receivable by lens adapter 20.

Sliding jaw member 55 is movably connected to left side-rail 22 and right side-rail 23 by means such as cooperative slide means 30. A preferred embodiment of jaw movement means, cooperative slide means 30, is partially visible in FIG. 3. This exemplary movement means includes slide means 30, which includes vertical grooves 32 in inner face 43 of left side-rail 22 (and of right side-rail 23, not visible), a vertical post 34 disposed within each groove 32, and adaptation of sliding jaw member ends 56,57 that allows ends 56,57 to engage grooves 32 and post 34 such that sliding jaw member ends 56,57 are retained by grooves 32 and post 34.

Because of the cooperation among grooves 32, post 34, and jaw member ends 56,57, sliding jaw member 55 is movably connected to body 21 and can slide smoothly up and down without binding.

Lens adapter 20 further includes bias means 37, for example a coil spring 38 mounted vertically on post 34, to maintain sliding jaw member 55 in the compressed position, unless an opposing force is applied. Preferably, bias means 37 comprises a pair of springs 38, each spring 38 mounted on one of the left and right posts 34.

Other arrangements are possible but not illustrated. For example, an alternative embodiment of cooperative slide means 30 includes a protruding vertical rail (not shown) on each side-rail inner face 43, adapted to fit a complementary feature of sliding jaw member ends 56,57. Bias means 37 could, for example, comprise strongly elastic straps (not shown) connected between the left end 56 of sliding jaw member 55 and left end 50 of fixed jaw member 25, with a similar strap connecting the corresponding right ends 57 and 51.

As can be seen from the description above, lens adapter 20 will fit camera lenses having an outside diameter between d and D. To achieve a firm grip at displacement d, assembly 10 needs a strong bias means 37. It is a design choice whether to provide a stronger or softer bias means 37, in order to have a comfortable balance of security and ease of use.

Lens adapter 20 may be provided in multiple sizes, for use on standard camera lenses, video camera lenses, large lenses such as telephoto, lens hoods, large-format camera lenses, one or more optical filters mounted on a lens by threaded or bayonet mount, or even a small bezel surrounding the lens of a pocket camera or cell phone. Two or three sizes of lens adapter 20 would generally be the most any photographer might need, with most users needing only one.

To mount lens adapter 20 onto a lens, sliding jaw member 55 is moved to its maximum displacement D, such as by holding lens adapter 20 on the front side and exerting pressure on sliding arcuate jaw 58 with a finger. The rear face, as depicted in FIG. 2, of jaw central opening 45 is moved toward the camera lens so that the end of the lens is inserted in jaw central opening 45. Pressure is released from sliding arcuate jaw 58, which is automatically moved by bias means 37 so that concave faces 53,59 grip the end of the camera lens, or other feature.

Figure 4:
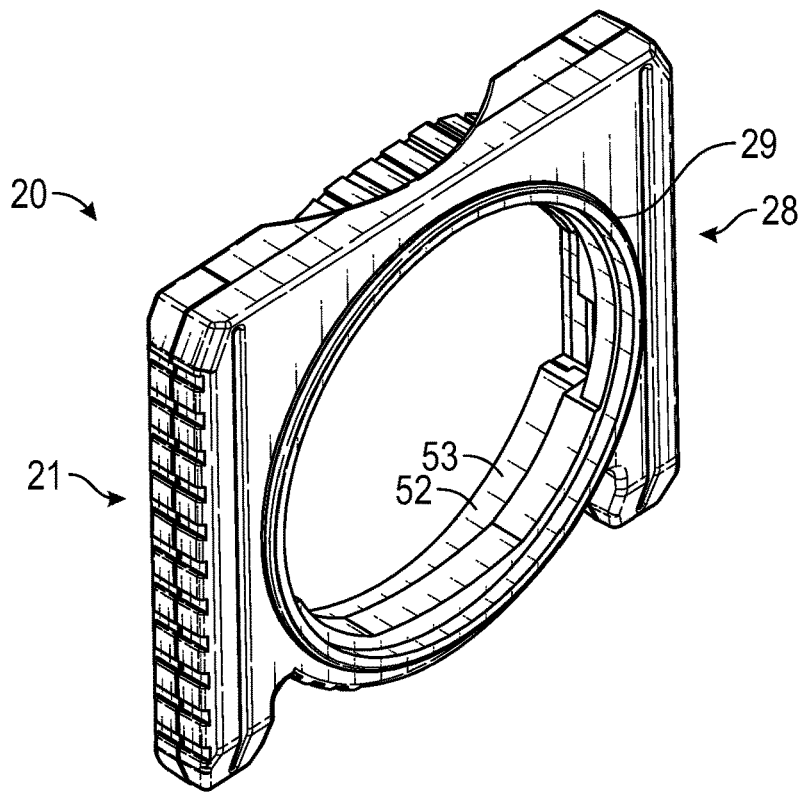
FIG. 4 is a front, top, left side perspective view of the lens adapter component of FIG. 2.

FIG. 4 is a front, top, left side perspective view of lens adapter 20 of FIG. 2. The front of body 21 includes first cooperative mounting means 28, such as projecting ring 29 for mounting filter holder 60. Projecting ring 29 may be integral to body 21 or attached to body 21 such as by adhesive. Projecting ring 29 is preferably a tough and low friction material.

Figure 5:
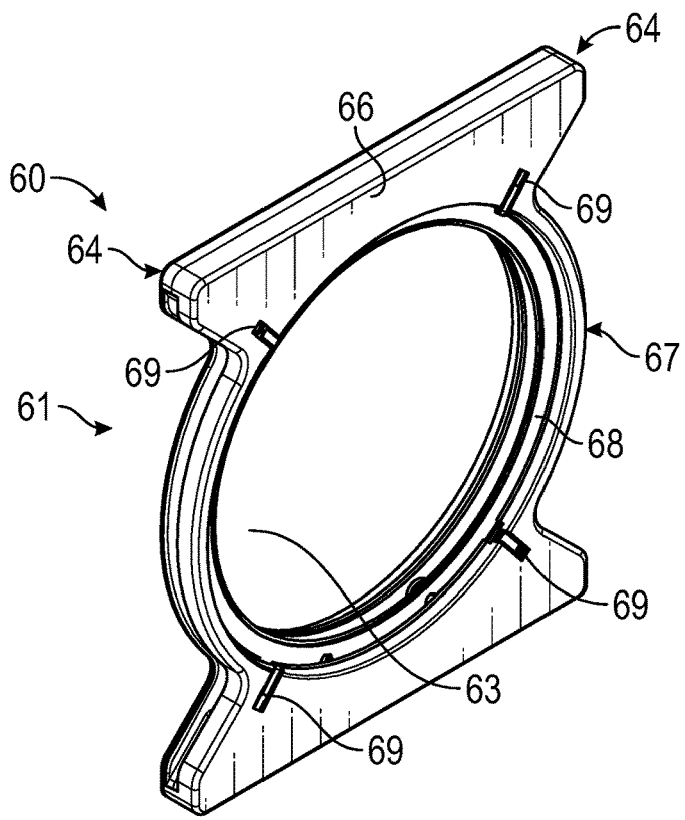
FIG. 5 is a rear right perspective view of a filter holder component of the assembly of FIG. 1.
Figure 6:
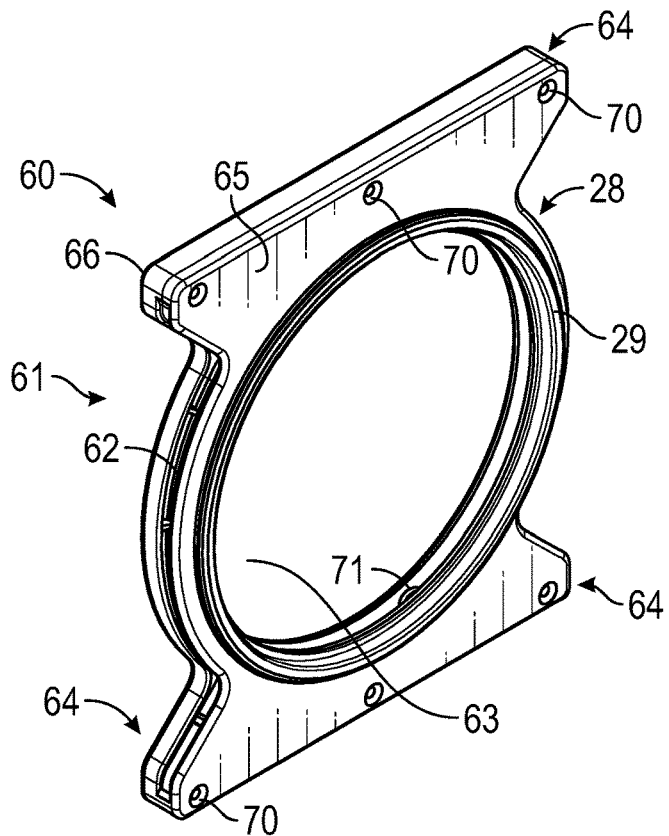
FIG. 6 is a front perspective view of a filter holder component of the assembly of FIG. 1.

FIG. 5 is a rear right perspective view of a filter holder 60, such as frame 61, of assembly 10 of FIG. 1. FIG. 6 is a front perspective view of a filter holder 60 of assembly 10 of FIG. 1.

Figure 7:
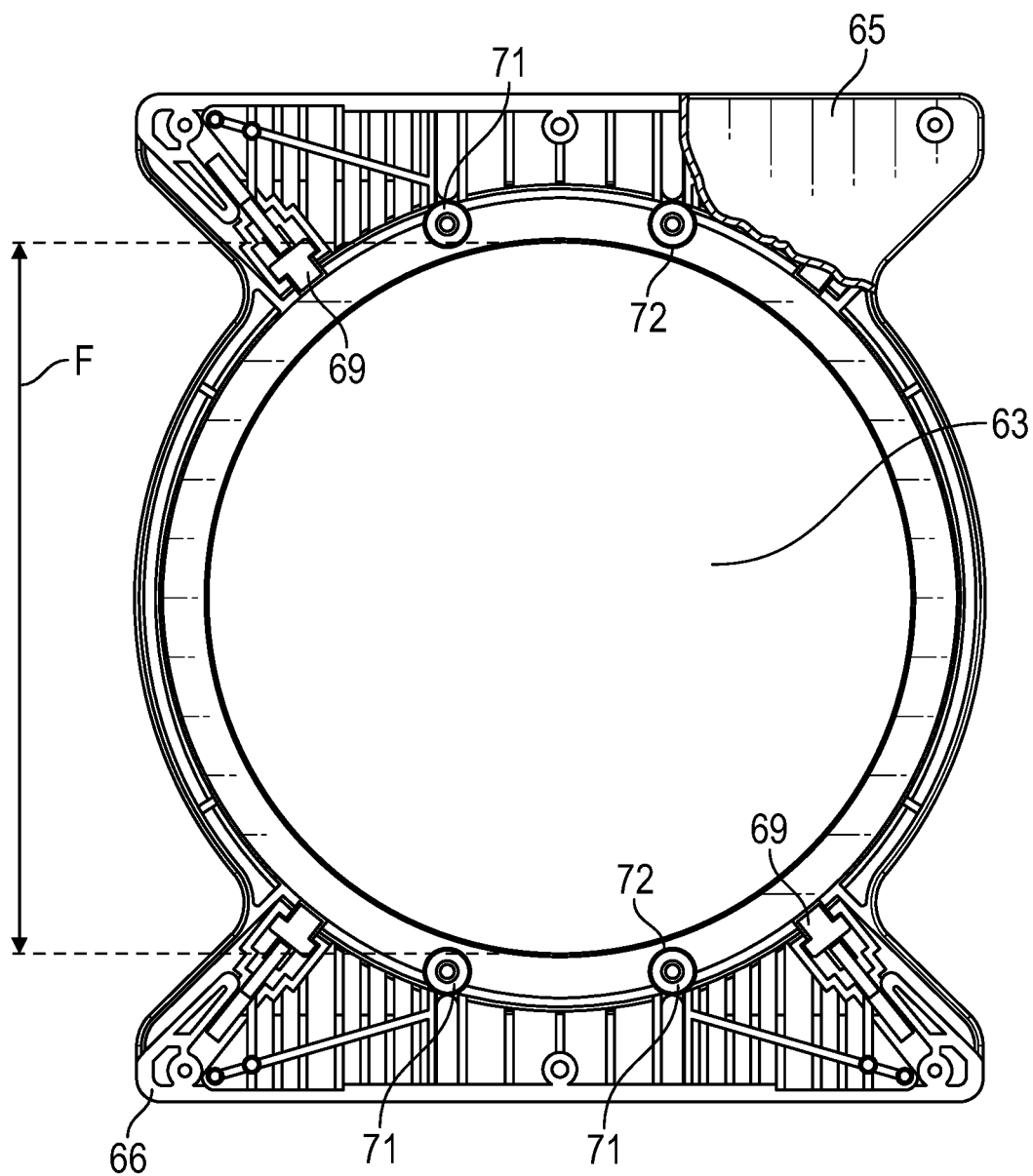
FIG. 7 is a front elevation view, partially cut-away, of a filter holder component of the assembly of FIG. 1.

FIG. 7 is a front perspective view, partially cut-away, of a filter holder 60 of assembly 10 of FIG. 1.

Filter holder 60 preferably includes a frame 61, composed of a front shell 65 and a rear shell 66, each shell 65,66 having an inner and an outer face. Front and rear shells 65,66 are attached together, inner face to inner face, by mechanical fasteners such as screws 70.

Rear shell 66 included second cooperative mounting means 67, such as a circular groove 68 adapted to receive projecting ring 29 with a press fit. The material of frame 61 is preferably low friction, as well as resilient. Projecting ring 29 and circular groove 68 may optionally include features such as shoulders or ledges, as are well known, that create "snap fit" between projecting ring 29 and circular groove 68.

Preferably, frame 61 includes a mechanical fastener, such as spring-biased clip 69, to help secure ring 29 in groove 68. Four clips 69 are depicted, so as to balance the forces applied and maintain ring 29 centered in groove 68. Preferably, at least one pair of clips 69 are included. The connection formed between first cooperative mounting means 28 and second cooperative mounting means 67 must be easily rotatable when needed but not free to rotate simply by gravity or movement of the camera. The connection must be removable when needed but firm enough not to be dislodged by wind or an accidental bump of the arm. The materials used, features of ring 29 and groove 68, as well as spring-biased clips 69, must be considered together to provide a cooperative mounting means 30 that is a desirable balance of ease of use and security.

Frame 61 includes a front shell 65 having an outer face and an inner face, a rear shell 66 having an outer face and an inner face, an optional handle 64, and a central aperture 63. Front shell 65 and rear shell 66 are connected, such as by screws 70, and frame 61 includes a slot 62, open to the exterior, for inserting a planar film filter. This is a manufacturing design choice and is not critical to the function of assembly 10.

In an alternative preferred embodiment of frame 61 (not illustrated), front shell 65 and rear shell 66 are joined at the top by a "living hinge". Front face 65 and rear face 66 may hinge to be separated like a clamshell to insert a planar film filter then joined such as by button snaps to retain the filter.

Filter holder 60 further includes alignment rollers 71 that define a constrained pathway F for the filter to follow when inserted into slot 62. Rollers 71 are disposed between front and rear shells 25,26 and adjacent central aperture 63 and include a circumferential groove 72. Rollers 71 are provided in pairs, with each roller 71 disposed on the opposite side of central aperture 63 from the other roller 71 of the pair. When a filter is inserted into slot 62 from one side of filter holder 60, circumferential grooves 72 guide the edges of the filter, and the center of the filter is exposed through central aperture 63. Rollers 71 are preferably composed of a material with moderately high coefficient of friction. When filter holder 60 containing a filter is snapped onto lens adapter 20 mounted on the end of a camera lens, the optical filter is held planar and perpendicular to the camera lens direction of view.

Turning to FIG. 6, front shell 65 of filter holder 60 includes first cooperative mounting means 28, identical to that of lens adapter 20. First mounting means 28 receives a second cooperative mounting means 67 of an additional filter holder 60. Several filter holders 60 may be ganged, or stacked, on lens adapter 20. FIG. 1 shows two filter holders 60 mounted on lens adapter 20, rotated 90 degrees relative to each other. Frame 61 optionally includes a tab or extended corner, such as a handle 64, to facilitate rotation of one holder 60 or another, independently of each other.

Although particular embodiments of the invention have been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

The invention claimed is:

1. A self-adjusting filter holder assembly for a camera lens having a front end having a diameter within a pre-determined range of diameters, said assembly for rotatably securing an optical filter to the front end, comprising:
    a lens adapter for mounting upon the front end of camera lens; including:
        a body; including a left side-rail including:
            a top end;
            a bottom end;
            a middle portion therebetween;
            an inner face; and
            left cooperative slide means;
        a right side-rail including:
            a top end;
            a bottom end;
            a middle portion therebetween;
            an inner face; and
            right cooperative slide means;
        a top rail connecting said top ends of said left side rail and said right side rail;

a fixed jaw member including:
a left end;
a right end; and
an arcuate jaw having:
a center-facing concave face; said fixed jaw member connecting said left side rail and said right side rail; and
a sliding jaw member including:
a left end;
a right end; and
an arcuate jaw having:
a center-facing concave face; said sliding arcuate jaw member connecting said left and right cooperative slide means and disposed between said left and right side rails; said fixed and sliding arcuate jaws disposed in opposition such that the concave faces of said fixed and sliding arcuate jaws face each other and define a central opening for receiving the front end of the camera lens; and wherein: said sliding arcuate jaw slides up or down said cooperative slide means between a closed-down position wherein the concave faces of said fixed and sliding arcuate jaws are at their minimum displacement and an opened position wherein the concave faces of said fixed and sliding arcuate jaws are at their maximum displacement; and
wherein:
said left and right cooperative slide means further include biasing means to move and retain said sliding arcuate jaw in the closed-down position unless upward force is applied to overcome the resistance of said bias means; and wherein the opposed concave faces of said fixed and sliding arcuate jaws are adapted to resiliently grip the front end of the camera lens;
a front; and
a back; and
filter holder mounting means for mounting a filter holder; and
a filter holder rotatably mounted on said lens adapter filter holding mounting means such that the filter held is disposed to completely cover the camera lens field of view and may be freely rotated.

2. The self-adjusting filter holder assembly of claim 1, said left and right side rails each including a lower end that extends downward beyond both said fixed arcuate jaw and said sliding arcuate jaw for supporting the end of a long camera lens when the camera is placed on a surface.

3. The self-adjusting filter holder assembly of claim 1, wherein: each said side-rail cooperative slide means comprises:
a vertical groove in each said inner face of each said side rail;
a post attached within each said vertical groove and wherein: each said left end and said right end of said sliding arcuate jaw includes:
cooperative slide means adapted for engaging one said post such that said sliding arcuate jaw slides along both said left and right posts between the open position and the closed-down position.

4. The self-adjusting filter holder assembly of claim 3, wherein said bias means is at least one coil spring disposed around at least one said post such that said coil spring and said post are longitudinally co-axial.

5. A self-adjusting filter holder assembly for a camera lens having a front end having a diameter within a pre-determined range of diameters; said assembly for rotatably securing an optical filter to the front end comprising:
a lens adapter body including:
a front face; including:
a first type filter holder mount for mounting a filter holder; and
a filter holder detachably, rotatably mounted on said first type filter holding mount of said lens adapter comprising:
a frame for receiving an optical planar filter and holding the filter in front of the camera lens such that the plane of the filter is substantially perpendicular to the direction of view of the camera lens and freely rotatable relative to the camera lens, including:
a central aperture for exposing the portion of the optical filter disposed in front of the camera lens;
a front shell having an outer face and an inner face; and
a rear shell having an outer face and an inner face; said front and said rear shells attached inner face to inner face by mechanical fasteners; and further including:
cooperative biased slide means for allowing said filter holder assembly to adjust automatically to securely attach to a camera lens front end of any diameter with the pre-determined range.

6. A self-adjusting filter holder assembly for a camera lens having a front end having a diameter within a pre-determined range of diameters; said assembly for rotatably securing an optical filter to the front end comprising:
a lens adapter body including:
a front face; including:
a first type filter holder mount for mounting a filter holder; and
a filter holder detachably, rotatably mounted on said first type filter holding mount of said lens adapter comprising:
a frame for receiving an optical planar filter and holding the filter in front of the camera lens such that the plane of the filter is substantially perpendicular to the direction of view of the camera lens including:
a central aperture for exposing the portion of the optical filter disposed in front of the camera lens;
a front shell having an outer face and an inner face;
a rear shell having an outer face and an inner face; said front and said rear shells connected inner face to inner face by mechanical fasteners;
an internal slot that communicates to the exterior of said filter holder frame, for receiving the optical filter; and
a pair of rollers for guiding and retaining the filter, said rollers disposed adjacent to and on opposite sides of said central aperture and defining a filter pathway between said pair of rollers.

7. A self-adjusting filter holder assembly for a camera lens having a front end having a diameter within a pre-determined range of diameters; said assembly for rotatably securing an optical filter to the front end comprising:
a lens adapter for mounting upon the camera lens; including:
a body including:
a front face; including:
a first type cooperative filter holder cooperative mount comprising:

an outwardly projecting ring with a diameter greater than the maximum distance between said fixed arcuate jaw and said sliding arcuate jaw;

a filter holder having a central aperture and including:
a front shell having an outer face and an inner face; and
a rear shell having an outer face and an inner face; including
second type cooperative mount for detachably, rotatably mounting said filter holder to said first type filter hold cooperative mount; comprising:
a circular groove with a diameter equal to that of said outwardly projecting ring and adapted to receive said outwardly projecting ring for detachably, rotatably said filter holder on said outwardly projecting ring; and
wherein:
said first type cooperative filter holder mount further includes:
a pair of spring-biased clips for receiving said outwardly projecting ring with a rotatable snap fit such that said outwardly projecting ring is unlikely to be detached accidentally; said lens adapter further including cooperative biased slide means for allowing said filter holder assembly to adjust automatically to securely attach to a camera lens front end of any diameter within the pre-determined range, such that the filter is disposed in the camera lens point of view and freely rotatable relative to the camera lens.

\* \* \* \* \*